(No Model.)
F. F. MARTIN.
SNATCH BLOCK.
No. 462,983. Patented Nov. 10, 1891.
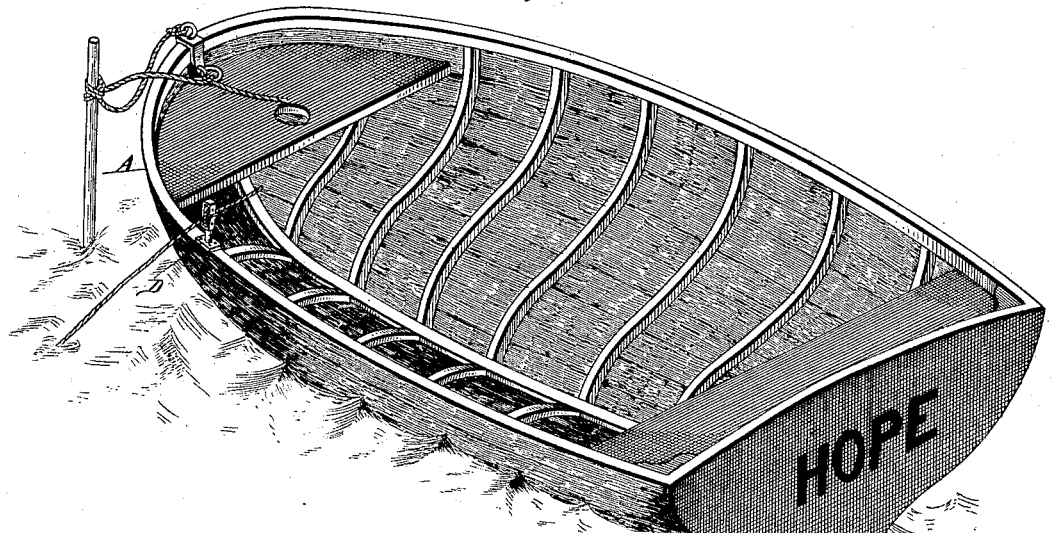
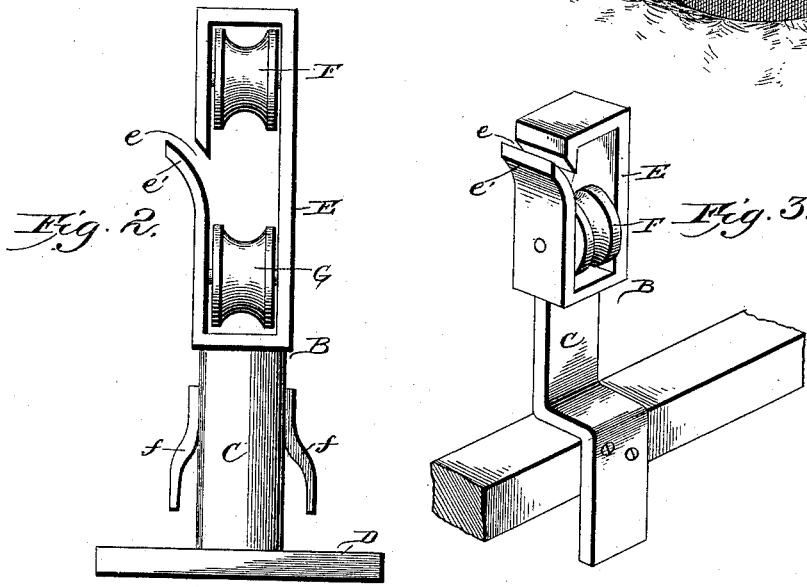
WITNESSES
F. L. Ourand
Van Buren Hillyard
INVENTOR
Frank Fructuoso Martin
By R. S. & A. P. Lacey
his Attorneys
THE NORRIS PETERS CO., PHOTO-LITHO., WASHINGTON, D. C.

UNITED STATES PATENT OFFICE.

FRANK FRUCTUOSO MARTIN, OF GLOUCESTER, MASSACHUSETTS.

SNATCH-BLOCK.

SPECIFICATION forming part of Letters Patent No. 462,983, dated November 10, 1891.

Application filed December 9, 1890. Serial No. 374,100. (No model.)

*To all whom it may concern:*

Be it known that I, FRANK FRUCTUOSO MARTIN, a citizen of the United States, residing at Gloucester, in the county of Essex and State of Massachusetts, have invented certain new and useful Improvements in Attachments for Ships; and I do hereby declare the following to be a full, clear, and exact description of the invention, such as will enable others skilled in the art to which it appertains to make and use the same.

This invention relates to sheave-block attachments for vessels, and has for its object to provide a device that can be quickly attached to the gunwale or other convenient portion of a fishing-smack, and which will prevent undue wear on the fishing-lines, and which will adapt itself to the direction of the strain and permit of the fishing-line being quickly applied and detached therefrom.

The improvement consists of a standard or support to be attached to the vessel, a sheave-frame connected with the said standard, so as to turn freely thereon, and having a slot in its side to permit the shipping and the unshipping of the line, and having a guide-flange at the lower end of the said slot to facilitate the insertion of the line when shipping it.

The improvement also consists of the novel features, which will be hereinafter more fully described and claimed, and which are shown in the annexed drawings, in which—

Figure 1 is a perspective view showing the application of the same. Fig. 2 is a side view of the attachment. Fig. 3 is a view of a modification.

A represents the front portion or bow of a fishing-smack, and B is the attachment applied thereto. The standard or support C is designed to be attached at its lower end to the gunwale of the boat, and is preferably provided at said lower end with the base-plate D, which is perforated to receive the screws, bolts, or other well-known fastening devices. The sheave-frame E has a swivel connection with the standard, whereby it will turn in all directions and adapt itself to the direction of strain on the line. The slot $e$ in the side of the sheave-frame admits of the fishing-line being quickly shipped and unshipped, and the flange $e'$, projected laterally from the under side of the said slot, gives direction to the line when shipping or adjusting it to the device. The upper end of the frame bordering on the slot is beveled to give sufficient width of slot and have as little passage-way on the inner side of the frame as possible. Two pulleys F and G are provided and located above and below the slot, as shown. In fishing in turbulent waters the boat rising and falling on the waves throws the line above and below the slot; hence the provision of the two pulleys to receive the thrust of the line and prevent the same rubbing on the corners of the sheave-frame. However, in calm waters one pulley will be sufficient, and this is located below the slot, as shown in Fig. 3.

The device being secured to the gunwale of the fishing-vessel, the fisherman, after casting his line, passes the same through the slot $e$ in the side of the sheave-frame and over the lower pulley and manipulates his line over the said pulley. After a fish has been hooked and drawn in the line is unshipped by withdrawing it through the said slot $e$, as will be readily understood.

It is not essential that the standard be secured at its lower end to the base-plate, as it may be extended down and bolted or otherwise secured to the side of the boat. Fig. 3 shows a standard constructed to be attached to the side of a boat. Cleats or blocks $f$ on the sides of the standard serve to secure the lines thereto when the fisherman is resting or called away to attend to other duties.

Having thus described my invention, what I claim, and desire to secure by Letters Patent, is—

1. The hereinbefore shown and described sheave-block, comprising a rigid frame, which is connected with a standard to turn freely thereon and having a slot in its side at a distance from its top and bottom and having a guide-flange projected from an end of the frame bordering on the slot out beyond the side of the frame to engage with and direct the line through the said slot, the other end of the frame bordering on the slot being beveled, and a pulley journaled in the frame to one side of a horizontal plane passing through the said slot, substantially as set forth.

2. The hereinbefore-specified sheave-block, comprising a standard, a rigid sheave-frame connected with the said standard and adapted to turn freely thereon and having a slot in its side and a flange projected laterally from the lower side of the slot to guide the line into and through the said slot, the end of the frame bordering in the upper side of the slot being beveled, and two pulleys journaled in the frame, the one above, the other below, the said slot, substantially as and for the purpose described.

In testimony whereof I affix my signature in presence of two witnesses.

FRANK FRUCTUOSO MARTIN.

Witnesses:
    WM. P. DOLLIVER,
    WM. C. DOLLIVER.